(12) United States Patent
Vondrell et al.

(10) Patent No.: US 11,827,369 B2
(45) Date of Patent: Nov. 28, 2023

(54) PROPULSION SYSTEM FOR AN AIRCRAFT

(71) Applicant: General Electric Company, Schenectady, NY (US)

(72) Inventors: Randy M. Vondrell, Cincinnati, OH (US); Anthony Austin Bouvette, Hamilton, OH (US); Glenn David Crabtree, Oregonia, OH (US)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 16/914,635

(22) Filed: Jun. 29, 2020

(65) Prior Publication Data

US 2020/0324906 A1 Oct. 15, 2020

Related U.S. Application Data

(63) Continuation of application No. 15/493,544, filed on Apr. 21, 2017, now Pat. No. 10,703,496.

(51) Int. Cl.
*B64D 27/24* (2006.01)
*B60L 50/16* (2019.01)
(Continued)

(52) U.S. Cl.
CPC .............. *B64D 27/24* (2013.01); *B60L 50/16* (2019.02); *B64C 21/06* (2013.01); *B64D 27/12* (2013.01); *B64D 27/18* (2013.01); *F02C 6/206* (2013.01); *F02K 3/04* (2013.01); *H02G 5/10* (2013.01); *H02K 7/1823* (2013.01);
(Continued)

(58) Field of Classification Search
CPC ................................. B64D 2027/026
See application file for complete search history.

(56) References Cited

U.S. PATENT DOCUMENTS 3,609,206 A   9/1971  McConnell
5,591,937 A * 1/1997  Woody .................... B60L 53/18
                                                       174/15.1
(Continued)

FOREIGN PATENT DOCUMENTS

EP    2581308 A2   4/2013
EP    2995555 A1   3/2016
(Continued)

OTHER PUBLICATIONS

Machine Translated Japanese Search Report Corresponding to Application No. 208079520 dated Jul. 22, 2019.
(Continued)

*Primary Examiner* — Nicholas McFall
(74) *Attorney, Agent, or Firm* — Dority & Manning, P.A.

(57) ABSTRACT

A propulsion system for an aircraft can include an electric power source and an electric propulsion assembly having an electric motor and a propulsor. The propulsor can be powered by the electric motor. An electric power bus can electrically connect the electric power source to the electric propulsion assembly. The electric power source can be configured to provide electrical power to the electric power bus. An inverter converter controller can be positioned along the electric power bus and can be electrically connected to the electric power source at a location downstream of the electric power source and upstream of the electric propulsion assembly.

18 Claims, 9 Drawing Sheets

(51) Int. Cl.

| | |
|---|---|
| *B64C 21/06* | (2023.01) |
| *B64D 27/12* | (2006.01) |
| *B64D 27/18* | (2006.01) |
| *F02C 6/20* | (2006.01) |
| *F02K 3/04* | (2006.01) |
| *H02G 5/10* | (2006.01) |
| *H02K 7/18* | (2006.01) |
| *B64D 27/02* | (2006.01) |

(52) U.S. Cl.
CPC ....... *B60L 2200/10* (2013.01); *B64C 2230/04* (2013.01); *B64D 2027/026* (2013.01); *B64D 2221/00* (2013.01); *Y02T 50/10* (2013.01); *Y02T 50/40* (2013.01); *Y02T 50/60* (2013.01)

(56) References Cited

U.S. PATENT DOCUMENTS

| | | | |
|---|---|---|---|
| 6,105,697 | A | 8/2000 | Weaver |
| 9,193,311 | B2 | 11/2015 | Siegel et al. |
| 9,751,614 | B1 | 9/2017 | Nguyen et al. |
| 11,142,315 | B2 | 10/2021 | McAdoo |
| 2007/0176432 | A1 | 8/2007 | Rolt |
| 2009/0272576 | A1 | 11/2009 | Medina |
| 2011/0071705 | A1 | 3/2011 | Matuszeski et al. |
| 2011/0177954 | A1 | 7/2011 | Gamble et al. |
| 2013/0094963 | A1 | 4/2013 | Rolt |
| 2013/0251525 | A1 | 9/2013 | Saiz |
| 2015/0001338 | A1 | 1/2015 | Siegel et al. |
| 2015/0144742 | A1 | 5/2015 | Moxon |
| 2016/0107758 | A1 | 4/2016 | Esteyne et al. |
| 2016/0355272 | A1 | 12/2016 | Moxon |
| 2017/0197730 | A1* | 7/2017 | Lutze .............. B64D 27/24 |
| 2017/0275009 | A1 | 9/2017 | Huang |
| 2017/0291712 | A1* | 10/2017 | Himmelmann ........ B64D 27/10 |
| 2018/0251228 | A1 | 9/2018 | Sands et al. |
| 2018/0297683 | A1* | 10/2018 | Armstrong ............ B63H 21/21 |

FOREIGN PATENT DOCUMENTS

| | | |
|---|---|---|
| GB | 2497136 A | 6/2013 |
| JP | 2002/210424 A | 4/2002 |
| JP | 2002/522875 A | 7/2002 |
| JP | 2013/505172 A | 2/2013 |
| WO | WO2013/079972 A1 | 6/2013 |

OTHER PUBLICATIONS

European Search Report Corresponding to U.S. Appl. No. 20/192,117 dated Oct. 16, 2020.

European Search Report Corresponding to EP18167802 dated Jun. 13, 2018.

Abdelhafez et al., A Review of More-Electric Aircraft, 13th International Conference on Aerospace Sciences & Aviation Technology, May 26-28, 2009, pp. 1-13.

Avery et al., Electrical Generation and Distribution for the more Electrical Aircraft, International Universities Power Engineering Conference, Sep. 4, 2007, pp. 1007-1012.

Rosero et al., Moving Towards a More Electric Aircraft, IEEE Aerospace and Electronic Systems Magazine, vol. 22, No. 3, Apr. 2, 2007, pp. 3-9.

Sarlioglu et al., More Electric Aircraft: Review, Challenges, and Opportunities for Commercial Transport Aircraft, IEEE Transactions on Transportation Electrification, vol. 1, No. 1, Jun. 2015, pp. 54-64.

Christou, "Optimisation of High Voltage Electrical Systems for Aerospace Applications", University of Manchester, Jan. 1, 2011, pp. 1-286.

* cited by examiner

PROPULSION SYSTEM FOR AN AIRCRAFT

CROSS-REFERENCE TO RELATED APPLICATION

This application claims priority to U.S. Non-Provisional application Ser. No. 15/493,544, entitled "PROPULSION SYSTEM FOR AN AIRCRAFT," filed on Apr. 21, 2017. The entire contents of the above-referenced application are hereby incorporated by reference in its entirety for all purposes.

FIELD

The present subject matter relates generally to an aircraft propulsion system, and more particularly to an aircraft propulsion system including an electric propulsion assembly and an electric power bus.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage.

More recently, propulsion systems have been proposed of a hybrid-electric design. With these propulsion systems, an electric power source may provide electric power to an electric fan to power the electric fan. These systems have been designed to operate at relatively low voltages (e.g., at or below 270 volts), as when the aircraft incorporating the propulsion system is operated at high altitudes, as is typical during cruise operation, a reduction in ambient air pressure may make higher voltage systems unwieldy.

However, the inventors of the present disclosure have found that utilizing a relatively low voltage system may be undesirable for situations requiring any substantial amount of power given a weight of the cables required to carry the increase in electrical current. Accordingly, a propulsion system capable of overcoming these obstacles would be useful.

BRIEF DESCRIPTION

Aspects and advantages of the invention will be set forth in part in the following description, or may be obvious from the description, or may be learned through practice of the invention.

In some embodiments of the present disclosure, a propulsion system for an aircraft can include an electric power source and an electric propulsion assembly having an electric motor and a propulsor. The propulsor can be powered by the electric motor. An electric power bus can electrically connect the electric power source to the electric propulsion assembly. The electric power source can be configured to provide electrical power to the electric power bus. An inverter converter controller can be positioned along the electric power bus and can be electrically connected to the electric power source at a location downstream of the electric power source and upstream of the electric propulsion assembly.

In some embodiments of the present disclosure, a propulsion system for an aircraft can include an electric power source and an electric propulsion assembly having an electric motor and a propulsor. The propulsor can be powered by the electric motor. An electric power bus can electrically connect the electric power source to the electric propulsion assembly. The electric power source can be configured to provide electrical power to the electric power bus. An inverter converter controller can be positioned along the electric power bus and electrically connected to the electric power source. The inverter converter controller can be configured to alter a voltage of the electric power received from the power source prior to powering the electric motor.

In some embodiments of the present disclosure, a method for operating a propulsion system for an aircraft can include generating electric power with an electric power source. The method can also include transferring the electric power generated with the electric power source to an electric propulsion assembly through an electric power bus, wherein the electric power bus is configured to transfer the electric power to the electric propulsion assembly at an output voltage between 800 and 20,000 volts. Lastly, the method can include generating thrust for the aircraft with the electric propulsion assembly, the electric propulsion assembly being powered by the electric power transferred through the electric power bus.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
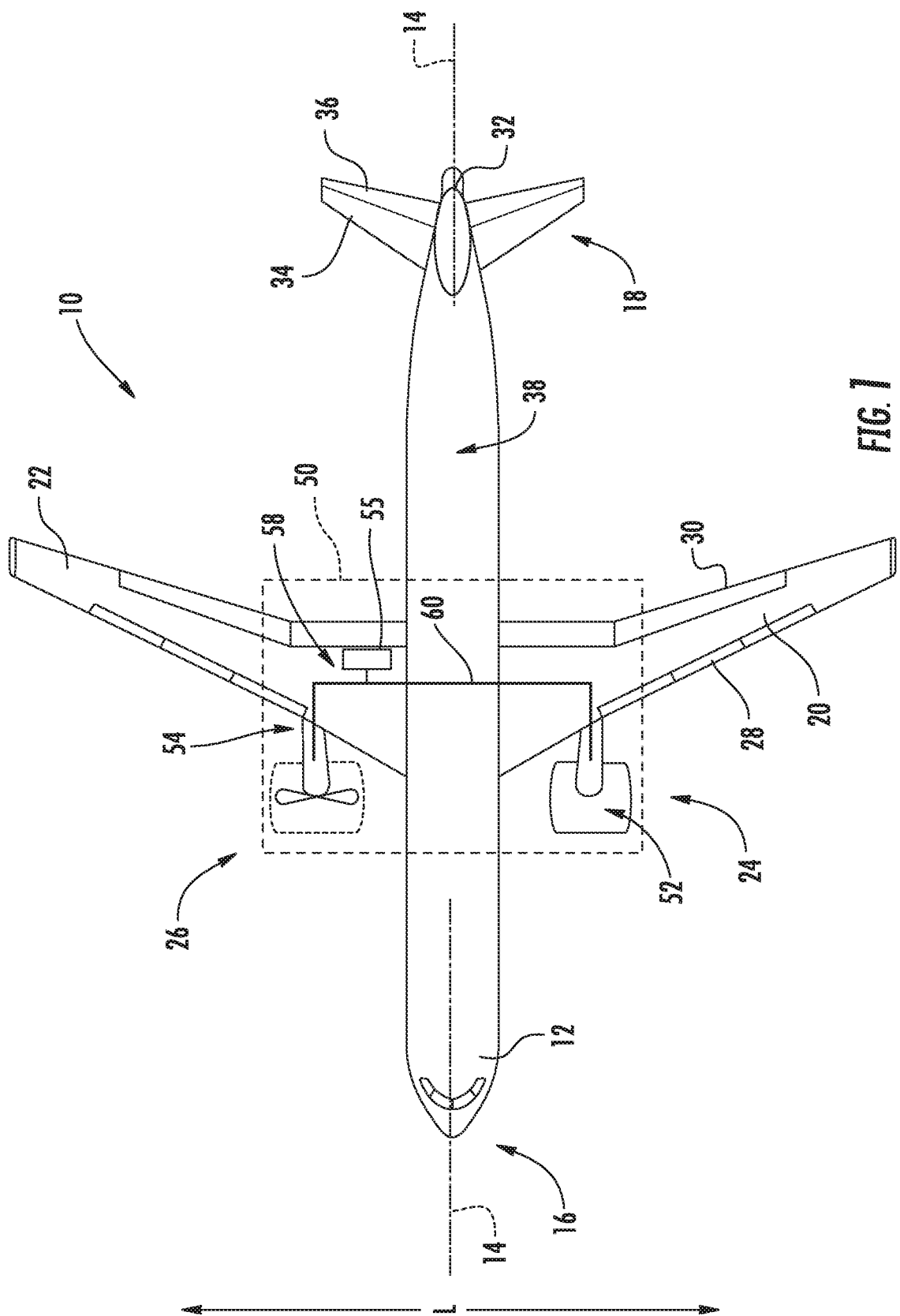
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
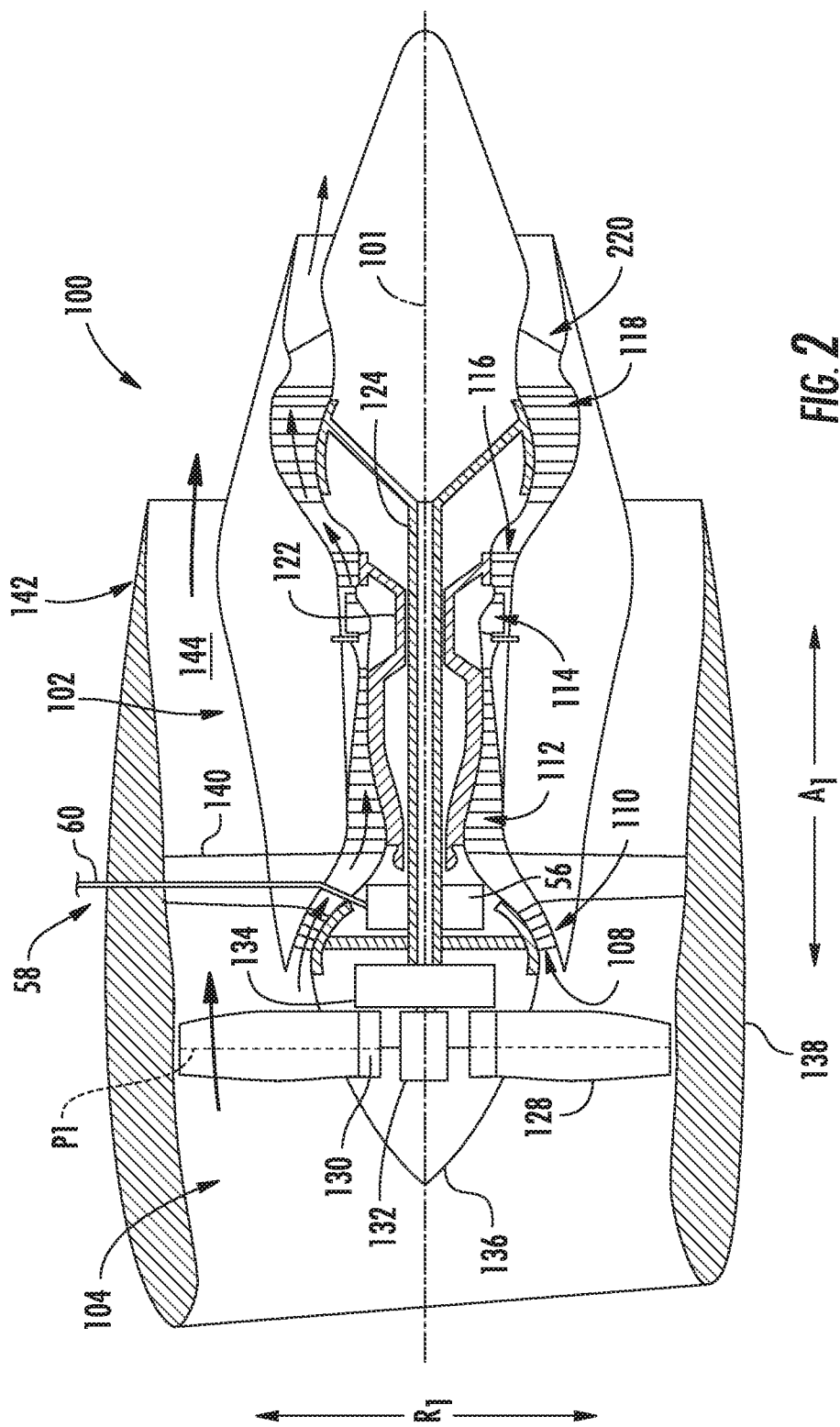
FIG. 2 is a schematic, cross-sectional view of a gas turbine engine mounted to the exemplary aircraft of FIG. 1.
Figure 3:
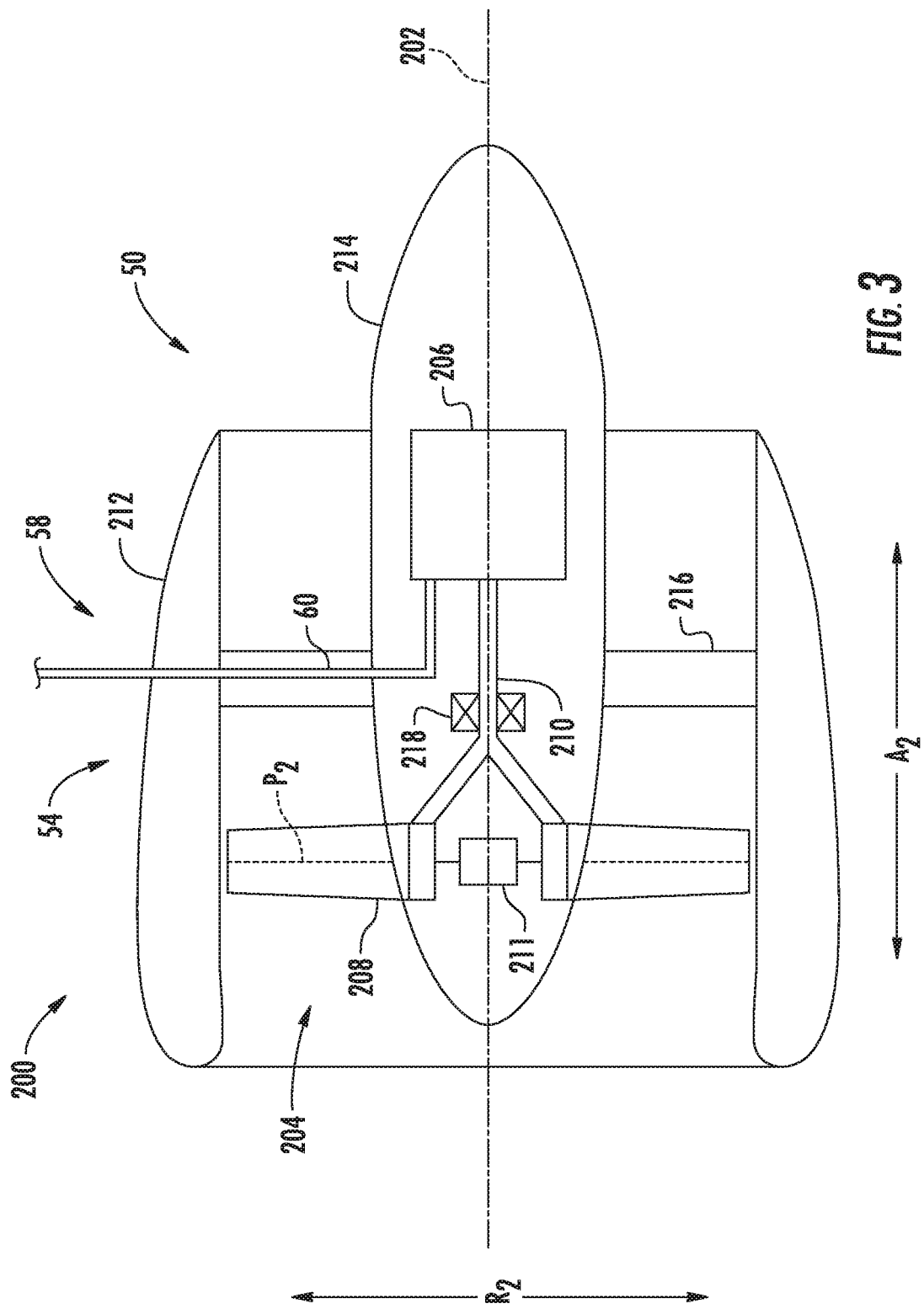
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine 102 and a primary fan (referred to simply as "fan 104" with reference to FIG. 2). More specifically, for the embodiment depicted the first propulsor assembly 52 is configured as a turbofan engine 100 (i.e., the turbomachine 102 and the fan 104 are configured as part of the turbofan 100).

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, low pressure (LP) turbine 118 and a second, high pressure (HP) turbine 116; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the first, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the propulsion system 50 additionally includes an electric machine, which for the embodiment depicted is configured as an electric generator 56. The electric generator 56 and turbofan engine 100 may generally be referred to herein as an electric power source of the propulsion system 50. Additionally, the electric generator 56 is, for the embodiment depicted, positioned within the turbomachine 102 of the turbofan engine 100 and is in mechanical communication with one of the shafts of the turbofan engine 100. More specifically, for the embodiment depicted, the electric generator is driven by the first, LP turbine 118 through the LP shaft 124. The electric generator 56 is configured to convert mechanical power of the LP shaft 124 to electric power. Accordingly, the electric generator 56 is also powered by the LP system (including the LP turbine 118) of the turbomachine 102.

It should be appreciated, however, that in other exemplary embodiments, the electric generator 56 may instead be positioned at any other suitable location within the turbomachine 102 or elsewhere, and may be, e.g., powered in any other suitable manner. For example, the electric generator 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric generator 56 may instead be powered by the HP system, i.e., by the HP turbine 116 through the HP shaft 122, or by both the LP system (e.g., the LP shaft 124) and the HP system (e.g., the HP shaft 122) via a dual drive system.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor assembly 52 may include any other suitable type of engine. For example, in other embodiments, the turbofan engine 100 may instead be configured as a turboprop engine or an unducted turbofan engine. Additionally, however, in other embodiments, the turbofan engine 100 may instead be configured as any other suitable combustion engine for driving the electric generator 56. For example, in other embodiments, the turbofan engine may be configured as a turboshaft engine, or any other suitable combustion engine.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted, the electrical power bus 58 includes one or more electrical cables or lines 60 connected to the electric generator 56, and for the embodiment depicted, extending through one or more of the outlet guide vanes 140. As will be discussed in greater detail below, the electric power bus is generally configured as a high-voltage electric power bus, such that the propulsion system 50 may generally operate with relatively high voltages.

Additionally, the propulsion system 50 depicted further includes one or more energy storage devices 55 (such as one or more batteries or other electrical energy storage devices) electrically connected to the electrical power bus 58 for, e.g., providing electrical power to the second propulsor assembly 54 and/or receiving electrical power from the electric generator 56. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor assembly 54 positioned, or configured to be positioned, at a location spaced apart from the first propulsor assembly 52. More specifically, for the embodiment depicted, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount in a manner such that they are spaced apart from one another, e.g., along the lateral direction L such that they ingest different airstreams along the lateral direction L.

Referring still to the exemplary embodiment of FIGS. 1 and 3, the second propulsor assembly 54 is mounted to the second side 26 of the aircraft 10, or rather to the second wing 22 of the aircraft 10. Referring particularly to FIG. 3, the second propulsor assembly 54 is generally configured as an electric propulsion assembly including an electric motor and a propulsor. More particularly, for the embodiment depicted, the electric propulsion assembly includes an electric fan 200, the electric fan including an electric motor 206 and a propulsor/fan 204. The electric fan 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric fan 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric fan 200 depicted additionally includes a fan casing or outer nacelle 212, attached to a core 214 of the electric fan 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric fan 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor).

As briefly noted above, the electric power source (i.e., the electric generator 56 of the first propulsor assembly 52 for the embodiment depicted) is electrically connected with the electric propulsion assembly (i.e., the electric motor 206 and the fan 204 of the electric fan 200 for the embodiment depicted) for providing electrical power to the electric propulsion assembly. More particularly, the electric motor 206 of the electric fan 200 is in electrical communication with the electric generator 56 through the electrical power bus 58, and more particularly through the one or more electrical cables or lines 60 extending therebetween. Again, as will be discussed in more detail below, the electric power bus 58 is configured to provide relatively high-voltage electrical power to the electric propulsion assembly for driving the electric propulsion assembly.

A propulsion system in accordance with one or more of the above embodiments may be referred to as a gas-electric, or hybrid, propulsion system, given that a first propulsor assembly is configured as a turbofan engine mounted to a first side of an aircraft and a second propulsor assembly is configured as an electrically driven fan mounted to a second side of the aircraft.

It should be appreciated, however, that in other exemplary embodiments the exemplary propulsion system may have any other suitable configuration, and further, may be integrated into an aircraft 10 in any other suitable manner. For example, referring now to FIG. 4, an aircraft 10 and propulsion system 50 in accordance with another exemplary embodiment of the present disclosure is depicted. The exemplary aircraft 10 and propulsion system 50 of FIG. 4 may be configured in substantially the same manner as exemplary aircraft 10 and propulsion system 50 of FIGS. 1 through 3, and accordingly, the same or similar numbers may refer to same or similar parts.

Figure 4:
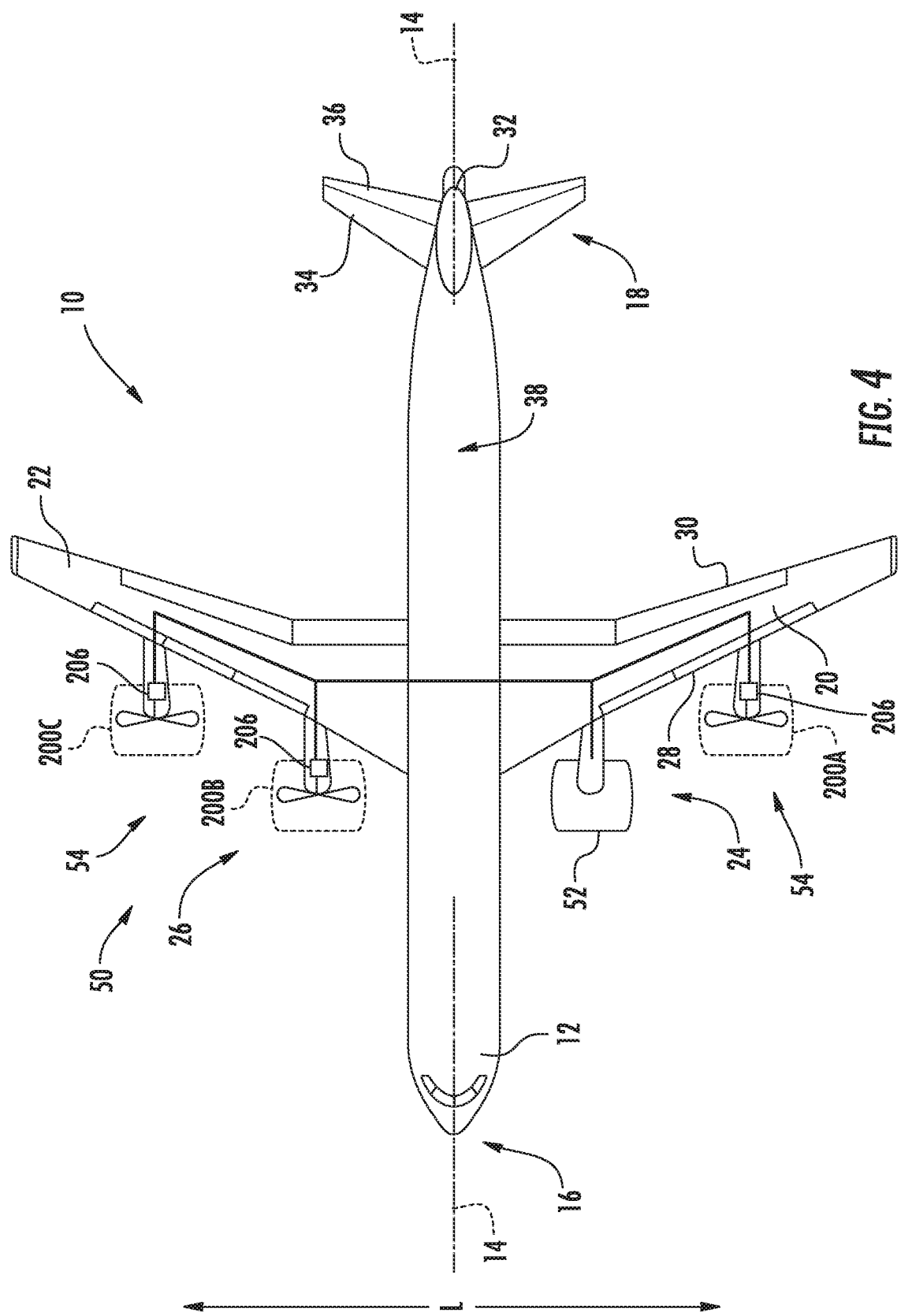
FIG. 4 is a top view of an aircraft including a propulsion system in accordance with another exemplary embodiment of the present disclosure.

For example, the exemplary aircraft 10 of FIG. 4 generally includes a fuselage 12 and a wing assembly, the wing assembly including a port side wing 20 and a starboard side wing 22. Additionally, the propulsion system 50 includes a first propulsor assembly 52. The first propulsor assembly 52 may be configured as, e.g., a turbofan. The propulsion system 50 additionally includes an electric generator 56 mechanically driven by the first propulsor assembly 52 (see, e.g., FIG. 2). Moreover, the propulsion system 50 includes a second propulsor assembly 54, which is an electric propulsion assembly. The electric generator 56 is electrically connected to the electric propulsion assembly through an electric power bus 58 for powering the electric propulsion assembly.

Notably, however, for the embodiment of FIG. 4, the electric propulsion assembly includes a plurality of electric motors 206 and a plurality of propulsors, each propulsor power by a respective one of the electric motors 206. More specifically, for the embodiment depicted, the electric propulsion assembly includes a plurality of electric fans 200, with the electric power source (i.e., the turbofan engine of the first propulsor assembly 52 and electric generator 56 for the embodiment depicted) electrically connected to the electric motors 206 of each of the plurality of electric fans 200 through the electric power bus 58.

More specifically, still, the electric propulsion assembly of FIG. 4 includes a first electric fan 200A mounted to the port side wing 20 of the aircraft 10 at a location laterally outward of the fuselage 12 relative to the first propulsor assembly 52. The electric propulsion assembly of FIG. 4 further includes a second electric fan 200B mounted to the starboard side wing 22 and a third electric fan 200C also mounted to the starboard side wing 22. The second and third electric fans 200B, 200C are spaced along the lateral direction L of the aircraft 10. Accordingly, for the exemplary embodiment of FIG. 4, the electric propulsion assembly includes a plurality of electric fans 200, the plurality of electric fans 200 including at least three electric fans 200.

Notably, however, in other exemplary embodiments, the electric propulsion assembly may include any other suitable number of electric fans 200. For example, in other exemplary embodiments the electric propulsion assembly may include two electric fans 200, four electric fans 200, or any other suitable number of electric fans 200. Additionally, the plurality of electric fans 200 may be arranged in any other suitable manner, and attached to the aircraft 10 at any suitable location (including, e.g., tail mounted configurations).

Moreover, it should further be appreciated that in still other exemplary embodiments, the propulsion system 50 and/or aircraft 10 may have other suitable configurations. For example, referring now to FIGS. 5 and 6, an aircraft 10 and propulsion system 50 in accordance with still another exemplary embodiment of the present disclosure is depicted. The exemplary aircraft 10 and propulsion system 50 of FIGS. 5 and 6 may be configured in substantially the same manner as exemplary aircraft 10 and propulsion system 50 of FIGS. 1 through 3, and accordingly, the same or similar numbers may refer to same or similar parts.

Figure 5:
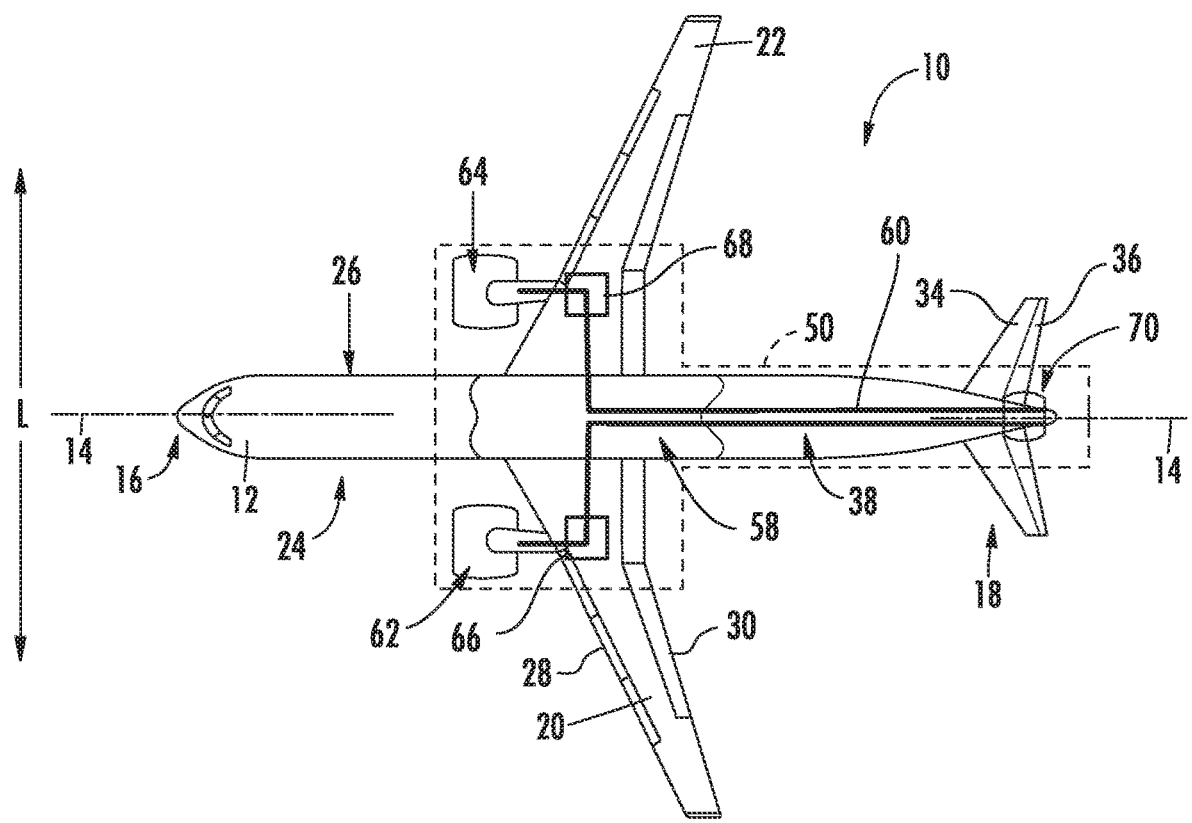
FIG. 5 is a top view of an aircraft including a propulsion system in accordance with yet another exemplary embodiment of the present disclosure.
Figure 6:
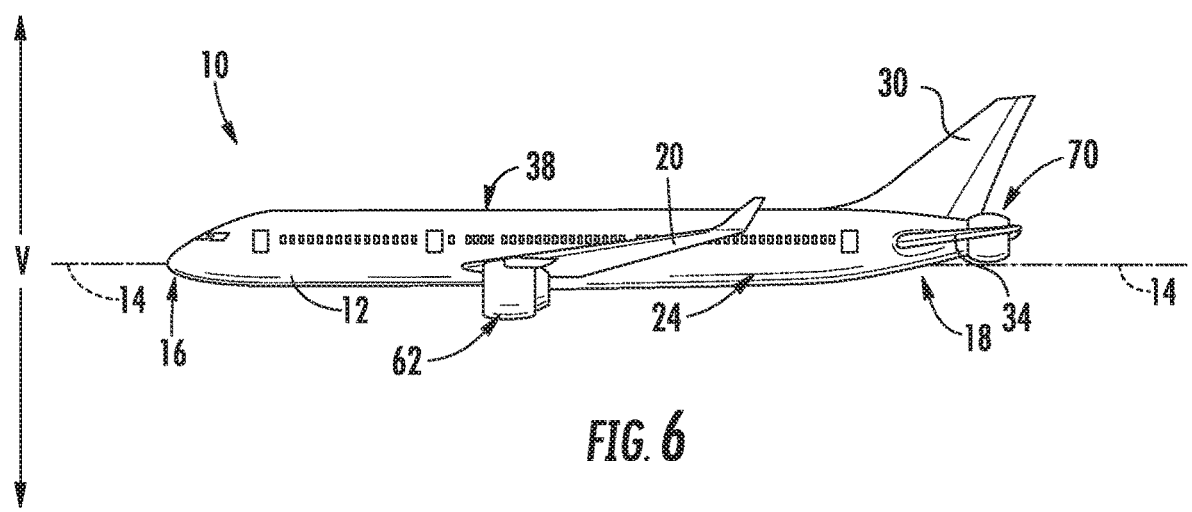
FIG. 6 is a port side view of the exemplary aircraft of FIG. 5

For example, the exemplary aircraft 10 of FIGS. 5 and 6 generally includes a fuselage 12 and a wing assembly, the wing assembly including a port side wing 20 and a starboard side wing 22. Additionally, the propulsion system 50 includes a first propulsor assembly 52 and one or more electric generators mechanically driven by the first propulsor assembly 52. Moreover, the propulsion system 50 includes a second propulsor assembly 54, which is an electric propulsion assembly. The first propulsor assembly 52 is electrically connected to, and configured to provide electrical power to, the second propulsor assembly 54 via an electric power bus 58.

However, for the embodiment of FIGS. 5 and 6, the first propulsor assembly 52 includes a first aircraft engine 62 and the second aircraft engine 64. For the embodiment depicted, the first and second aircraft engines 62, 64 are configured as gas turbine engines, or rather as turbofan engines (see, e.g., FIG. 2) attached to and suspended beneath the wings 20, 22 in an under-wing configuration. Additionally, for the embodiment of FIGS. 5 and 6, the propulsion system 50 further includes one or more electric generators operable with the engines 62, 64. More specifically, for the embodiment depicted, the propulsion system 50 further includes a first electric generator 66 operable with the first jet engine 62 and a second electric generator 68 operable with the second jet engine 64. Although depicted schematically outside the respective jet engines 62, 64, in certain embodiments, the electric generators 66, 68 may be positioned within a respective jet engine 62, 64 (see, e.g., FIG. 2). Additionally, it will be appreciated that the electric generators 56, 68 are configured to convert the mechanical power to electrical power, and provide such electrical power to the electric propulsion assembly via the electric power bus 58.

Further, for the embodiment of FIGS. 5 and 6, the electric propulsion assembly includes an electric fan 70 configured to be mounted at the aft end 18 of the aircraft 10, and hence the electric fan 70 depicted may be referred to as an "aft engine." Further, the electric fan 70 depicted is configured to ingest and consume air forming a boundary layer over the fuselage 12 of the aircraft 10. Accordingly, the exemplary electric fan 70 depicted in FIGS. 5 and 6 may also be referred to as a boundary layer ingestion (BLI) fan. The electric fan 70 is mounted to the aircraft 10 at a location aft of the wings 20, 22 and/or the jet engines 62, 64. Specifically, for the embodiment depicted, the electric fan 70 is fixedly connected to the fuselage 12 at the aft end 18, such that the electric fan 70 is incorporated into or blended with a tail section at the aft end 18.

It should be appreciated, however, that in still other exemplary embodiments of the present disclosure, any other suitable aircraft 10 may be provided having a propulsion system 50 configured in any other suitable manner. For example, in other embodiments, the electric fan 70 may be incorporated into the fuselage of the aircraft 10, and thus configured as a "podded engine," or pod-installation engine. Further, in still other embodiments, the electric fan 70 may be incorporated into a wing of the aircraft 10, and thus may be configured as a "blended wing engine." Moreover, in other embodiments, the electric fan 70 may not be a boundary layer ingestion fan, and instead may be mounted at any suitable location on the aircraft 10 as a freestream ingestion fan.

Furthermore, in certain embodiments the first and second engines 62, 64 of the first propulsor assembly 52 may be configured as any suitable jet engine, such as turbofan engines, turboprop engines, turbojet engines, etc. Further, although the first propulsor assembly 52 includes two jet engines, in other embodiments, the first propulsor assembly 52 may have any other suitable number of jet engines, with one or more of which driving an electric generator. Further, still, in other embodiments, the propulsion system 50 may not include a first propulsion system 52 having, e.g. jet engines, and may instead have any other suitable engine(s) for rotating generator(s) and producing electrical power (i.e., may have any other suitable power source).

Figure 7:
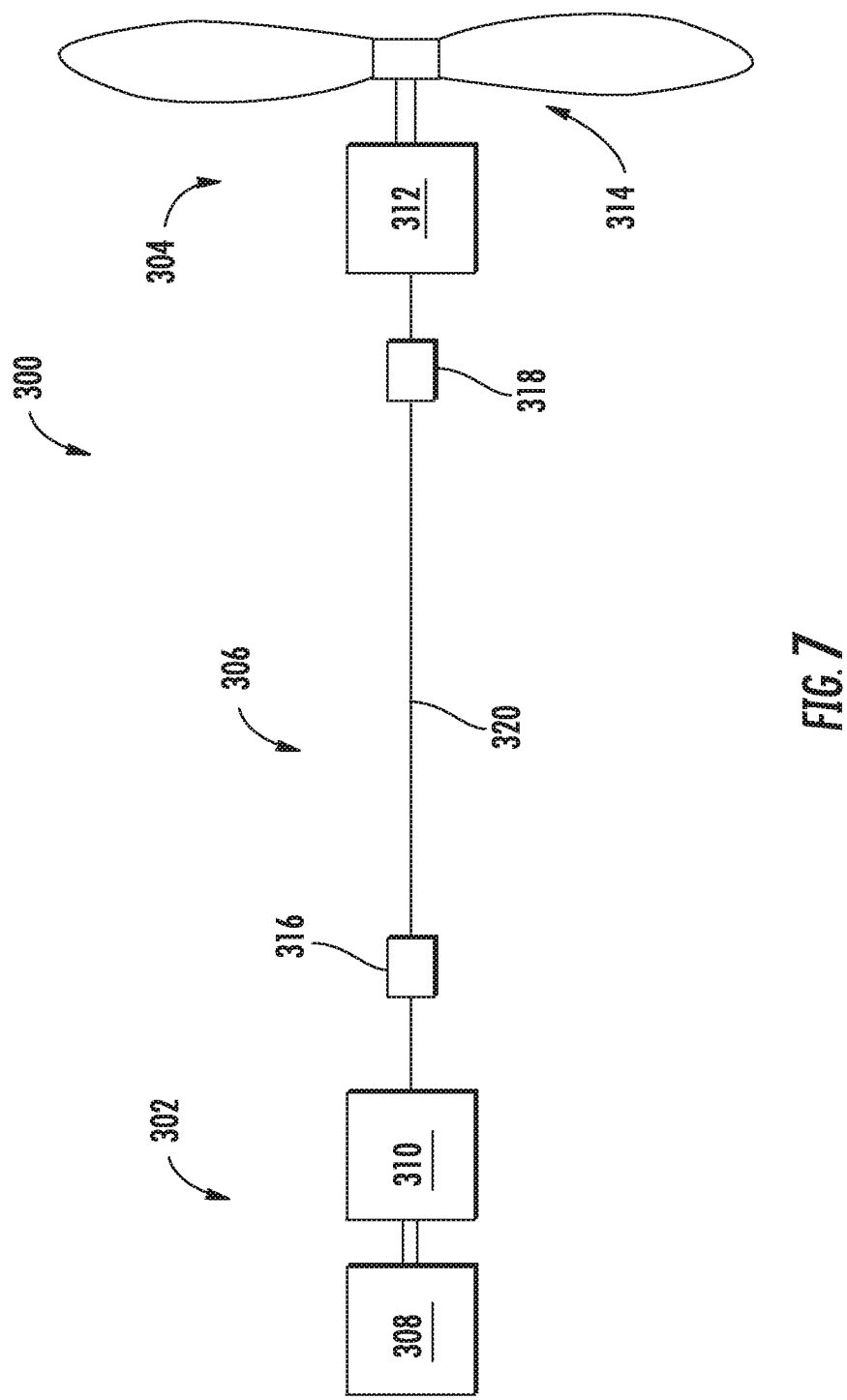
FIG. 7 is a schematic view of a propulsion system in accordance with an exemplary embodiment of the present disclosure.

Referring now to FIG. 7, a schematic view is provided of a propulsion system 300 in accordance with an exemplary embodiment of the present disclosure. The exemplary propulsion system 300 may be configured in accordance with one or more of the exemplary embodiments discussed above with reference to FIGS. 1 through 6.

For the embodiment of FIG. 7, the exemplary propulsion system 300 generally includes an electric power source 302, an electric propulsion assembly 304, and an electric power bus 306 electrically connecting the electric power source 302 to the electric propulsion assembly 304. More specifically, for the embodiment depicted, the electric power source 302 includes a combustion engine 308 and an electric generator 310. As discussed above with the embodiments of FIGS. 1 through 6, in certain embodiments the combustion engine 308 may be, e.g., one or more turbofan engines (see, e.g., FIG. 2), a turboprop engines, a turboshaft engines, or any other suitable engines. The electric generator 310 is mechanically coupled to the combustion engine 308, such that the combustion engine 308 drives/powers the electric generator 310. Moreover, for the embodiment depicted, the electric propulsion assembly 304 includes an electric motor 312 and a propulsor 314, with the propulsor 314 being mechanically coupled to and powered by the electric motor 312. Although the electric propulsion assembly 304 is depicted as including a single electric motor 312 and propulsor 314, in other exemplary embodiments, the electric propulsion assembly 304 may instead include a plurality of electric motors 312 and a respective plurality of propulsors 314.

Further, for the embodiment depicted the propulsion system 300 is configured as a high-voltage propulsion system, with the electric power bus 306 configured to facilitate transfer of electrical power at relatively high voltages. More specifically, the electric power source 302 is configured to provide electrical power to the electric power bus 306, and the electric power bus 306 is configured to transfer the electrical power to the electric propulsion assembly 304 at a voltage exceeding 800 volts ("V"). For example, in certain exemplary embodiments, the electric power bus 306 may be configured to transfer electrical power received from the electric power source 302 to the electric propulsion assembly 304 at a voltage between about 1,000 V and about 20,000 V, such as between about 1,100 V and about 8,000 V.

It will be appreciated, that by transferring electrical power from the electric power source 302 to the electric propulsion assembly 304 (via the power bus 306) at relatively high voltages, the electric power source 302 may be able to transfer such electrical power at a lower electrical current while still delivering a desired amount of power. For example, in certain exemplary embodiments, the electric power bus 306 may be configured to transfer electrical power to the electric propulsion assembly 304 at an electrical current between about 30 amps ("A") and about 1,200 A, such as between about 100 A and about 1,000 A. With such an exemplary embodiment, the electric power bus 306 may be configured to transfer at least about 750 kilowatts of electrical power to the electric propulsion assembly 304 and up to about twelve (12) megawatts of electrical power. For example, in certain exemplary embodiments the electric power bus 306 may be configured to transfer at least about one (1) megawatt of electrical power to the electric propulsion assembly 304, such as between about one (1) megawatt of electrical power and about two (2) megawatts of electrical power.

Referring still to FIG. 7, for the embodiment depicted the electric power bus 306 further includes one or more inverter converter controllers ("ICC"). More specifically, the electric power bus 306 includes a first ICC 316 electrically connected to the electric power source 302 at a location immediately downstream of the electric power source 302, and a second ICC 318 electrically connected to the electric propulsion assembly 304 at a location immediately upstream of the electric propulsion assembly 304. Additionally, the first and second ICCs 316, 318 are electrically connected through a transfer cable 320 of the electric power bus 306.

The first ICC 316 may be configured to, e.g., convert electrical power from an alternating current ("AC") electric power configuration to a direct current ("DC") electric power configuration, or vice versa. Additionally, in certain embodiments, the first ICC may also be configured to receive electrical power from the electric power source 302 at a relatively low voltage, and transfer such electrical power to the transfer cable 320 at a relatively high voltage. For example, in certain embodiments, the first ICC 316 may be configured to increase a voltage of the electric power received from the electric power source 302 by at least 20%, such as by at least 40%, such as by at least 80%, such as by at least 100%. For example, in certain embodiments, the first ICC 316 may be configured to increase a voltage of the electric power received from the electric power source 302 by up to 1,000%. Additionally, in certain exemplary embodiments, the second ICC 318 may similarly be configured to, e.g., convert electrical power from a DC electric power configuration to an AC electric power configuration, or vice versa, and further may be configured to receive electrical power from the transfer cable 320 at a relatively high voltage, and transfer such electrical power to the electric propulsion assembly 304 at a relatively low voltage. For example, in certain exemplary embodiments, the second ICC 318 may be configured to decrease a voltage of the electric power received from the transfer cable 320 by at least 20%, such as by at least 40%, such as by at least 80%, such as by at least 100%. For example, in certain embodiments, the second ICC 318 may be configured to decrease a voltage of the electric power received from the transfer cable 320 by up to 1,000%.

It should be appreciated, however, that in other exemplary embodiments, the power bus 306 of the propulsion system 300 may have any other suitable configuration. For example, in other exemplary embodiments, the power bus 306 may not include one or both of the first ICC 316 or the second ICC 318. For example, in certain exemplary embodiments, the transfer cable 320 may be configured to directly electrically connect the electric power source 302 to the electric propulsion assembly 304 (i.e., the electric generator 310 of the electric power source 302 directly to the electric motor 312 of the electric propulsion assembly 304). Additionally, or alternatively, in certain embodiments, the first and second ICCs 316, 318 may not be configured to substantially modify the voltage of the electrical power provided therethrough. Accordingly, with such an embodiment, the electrical power generated by the electric power source 302 may be transmitted and delivered through the power bus 306 to the electric propulsion assembly 304 at substantially the same voltage at which it was produced. Such a configuration may reduce an overall weight of the system.

As stated, transferring the electric power within the propulsion system 200 at relatively high voltages may allow for transferring such electrical power at a reduced electrical current, while still providing a desired amount of power. As will be appreciated, such a configuration may allow for cables having a reduced thickness, or diameter, which may save weight in an aircraft including the exemplary propulsion system 300. More particularly, for the exemplary propulsion system 300 depicted in FIG. 7, such a configuration may allow for, e.g., the transfer cable 320 of the electric power bus 306 to have a reduced thickness, or diameter, to save weight. Notably, with certain exemplary propulsion systems, the transfer cable 320 may be required to extend relatively long distances, such that a reduced thickness, or diameter, may save an appreciable amount of weight (see, e.g., the embodiments of FIG. 1, FIG. 4, and FIGS. 5 and 6).

However, it will further be appreciated that by the operating the electric power bus 306 at the relatively high voltages, a risk of a partial discharge, or corona discharge, is increased. Moreover, given that the propulsion system 300 will be operating at relatively high altitudes (i.e., with reduced ambient pressures) this risk of partial discharge, or corona discharges, is increased even further.

Figure 8:
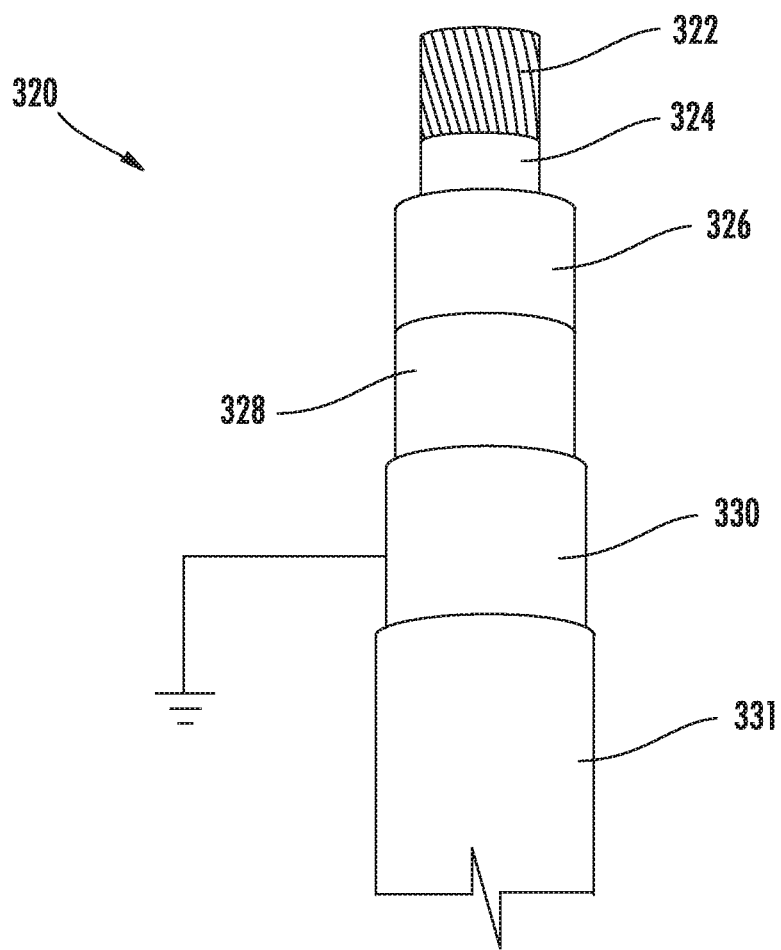
FIG. 8 is a side, sectional view of a cable of an electric power bus of the exemplary propulsion system of FIG. 7.

Accordingly, for the exemplary propulsion system 300 depicted in FIG. 7, the transfer cable 320 of the electric power bus 306 is configured as a high-voltage cable configured to carry the electrical power having the relatively high voltages from the electric power source 302 to the electric propulsion assembly 304. More particularly, referring now to FIG. 8, a sectional view is provided of a portion of a transfer cable 320 in accordance with an exemplary embodiment of the present disclosure, as may be utilized with the exemplary power bus 306 of FIG. 7. For the embodiment of FIG. 8, the transfer cable 320 includes a conductor 322, a conductor screen 324 enclosing the conductor 322, and an insulation layer 326 enclosing the conductor screen 324. For the embodiment depicted, the conductor 322 is configured as a braided conductor, such as a braided copper wire or a braided aluminum wire. Such a configuration may provide for increased flexibility of the transfer cable 320. Additionally, the conductor screen 324 is configured as a semi-conductive conductor screen, and as will be appreciated, is configured to minimize a risk of a partial discharge or a corona discharge generally by smoothing out an electrical field gradient surrounding the conductor 322. It should be appreciated, that as used herein, the term "semi-conductive" refers to generally to any material having a volume resistivity between about 1 ohm-meter and about 1,000,000 ohm-meters.

Notably, as for the embodiment depicted the conductor 322 is a braided conductor, there will inherently be air gaps on an outer surface (e.g., between strands). These air gaps, or more particularly the strands defining the air gaps, may provide for relatively high concentrations of the electric field lines at, e.g., an outer radius of the strands of the conductor 322. The conductor screen 324 disperses these relatively high concentrations of electrical field lines and further reduces a potential for the air gaps to breakdown at altitude. This is achieved by either filling the air gaps with the semi-conductive conductor screen 324, or mitigating the electric field gradient by effectively extending out the outer radius of the conductor 322. In certain embodiments, the conductor screen 324 may be a carbon-impregnated material, such as a carbon-impregnated polyethylene, EPR (ethylene propylene rubber), silicon rubber, or alternatively may be formed of any other suitable material. Additionally, in certain embodiments, the conductor screen 324 may have a thickness between about two thousandths of an inch ("mils")

and about one hundred mils. For example, the conductor screen 224 may have a thickness between about four mils and about fifty mils.

Additionally, for the embodiment depicted, the insulation layer 326 may be, e.g., EPR (ethylene propylene rubber), XLPE (crosslinked polyethylene), or a silicone rubber insulation layer. Moreover, for the embodiment depicted, the transfer cable 320 further includes an insulator screen 328 enclosing the insulation layer 326. The insulator screen 328, similar to the conductor screen 324, is configured as a semi-conductive insulator screen configured to minimize a risk of a partial discharge or a corona discharge generally by smoothing out a potential electrical field gradient surrounding the insulation layer 326/dispersing relatively high concentrations of electrical field lines. The insulator screen 328 may, in certain embodiments, be configured in substantially the same manner as the conductor screen 324 described above.

Notably, the transfer cable 320 further includes a metallic shield 330 surrounding the insulation screen 328 and an outer sheath 330 surrounding the metallic shield. The metallic shield 330 is a grounded metallic shield (shown schematically in FIG. 8). One or both of the insulation screen 328 and conductor screen 324 (depending on the configuration) provide a shallow electrical field gradient and a strong electro-mechanical bond between, e.g., the metallic shield 330 (i.e., a metal layer) and the insulation layer 326. The outer sheath 331 may have any suitable configuration for providing general protection for a transfer cable 320. It should be appreciated, however, that in other exemplary embodiments, the transfer cable 320 may further have additional layers not described herein, or alternatively may not include one or more of the layers described herein.

Additionally, it should further be appreciated that in still other exemplary embodiments, the power bus 306 may have any other suitable configuration for transferring electrical power at the relatively high voltages required by the propulsion system 300. For example, referring now to FIG. 9, in certain exemplary embodiments, the power bus 306 may further include a coolant system 332 for cooling one or more of the cables of the power bus 306, such as the transfer cable 320. The exemplary power bus 306 of FIG. 9 may be configured in substantially the same manner as exemplary power bus 306 of FIG. 7. For example, the power bus 306 of FIG. 9 includes a transfer cable 320 electrically connecting the electric power source 302 to the electric propulsion assembly 304, and is configured to transfer electrical power through the transfer cable 320 from the electric power source 302 to the electric propulsion assembly 304 at a voltage exceeding, e.g., 800 V.

Figure 9:
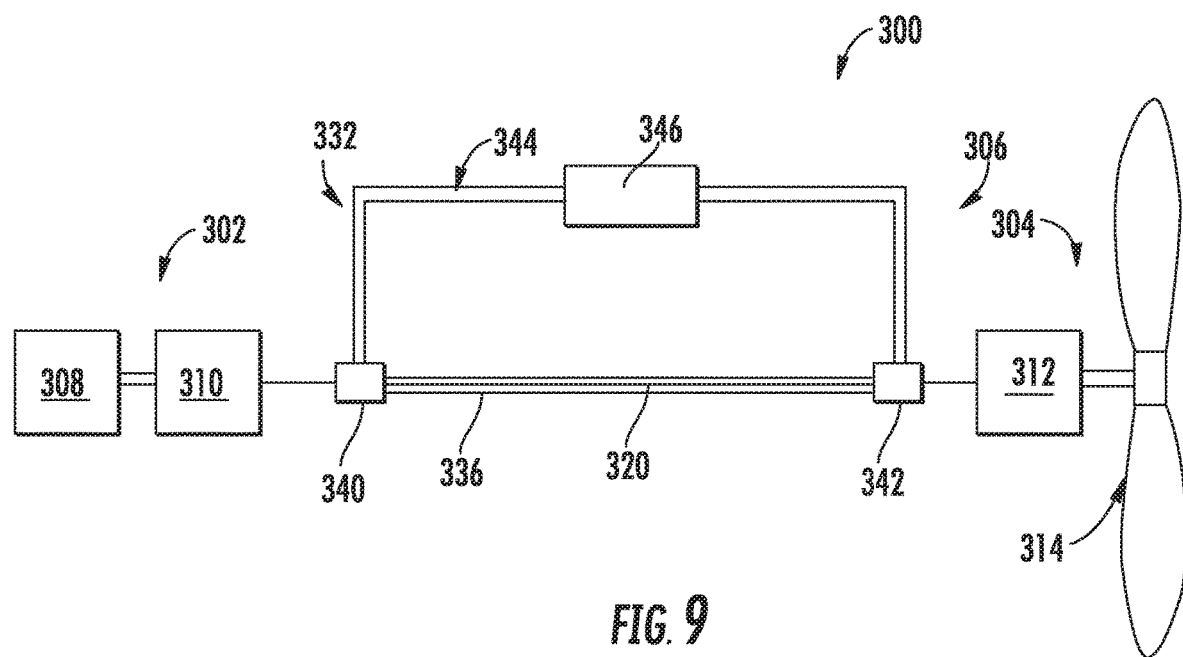
FIG. 9 is a schematic view of a propulsion system in accordance with another exemplary embodiment of the present disclosure.
Figure 10:
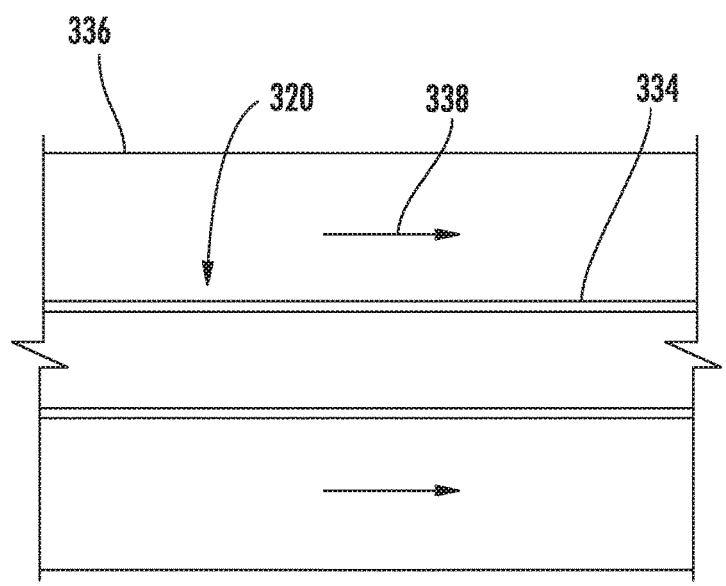
FIG. 10 is a close-up, side, cross-sectional view of a section of an electric power bus of the exemplary propulsion system of FIG. 9.

However, for the embodiment of FIG. 9, the electric power bus 306 further includes the coolant system 332. The coolant system 332 includes at least a portion extending concentric with at least a portion one or more cables of the power bus 306 (such as the transfer cable 320). For example, referring briefly to FIG. 10 a close-up, side, cross-sectional view of a section of the exemplary power bus 306 of FIG. 9 is provided. As is depicted, the power bus 306 includes the transfer cable 320. The exemplary transfer cable 320 of FIG. 10 may be configured in substantially the same manner as exemplary transfer cable depicted in FIG. 8. However, for the embodiment of FIG. 10, the transfer cable 320 further includes a sealing layer 334 for providing a watertight seal for the transfer cable 320.

Moreover, for the embodiment depicted, at least a portion of the transfer cable 320 extends within a cooling line 336 of the coolant system 330. More specifically, for the embodiment depicted, the transfer cable 320 extends generally coaxially with the cooling line 336 of the system, such that a flow of coolant 338 through the cooling line 336 of the core system 330 flows around the transfer cable 320 and may operate to, e.g., accept heat from the transfer cable 320 to cool the transfer cable 320. Notably, inclusion of the coolant system 330 may allow for the use of materials within the power bus 306, and more specifically, within the transfer cable 320, that otherwise may not be capable of withstanding the temperature demands of the transfer cable 320. For example, inclusion of the coolant system 330 may allow for an insulation layer 326 of the transfer cable 322 be formed of, e.g., a silicone rubber, or further still, of an EPR or XLPE (each of which being lower-temperature materials than silicone rubber).

Referring now back to FIG. 9, it will be appreciated that the coolant system 330 of the electric power bus 306 operates as a closed loop system. For example, the coolant system 330 further includes a first transfer box 340 and a second transfer box 342, with the cooling line 336 extending therebetween (and the transfer cable 320 extending concentrically/coaxially therewith). The first and second transfer boxes 340, 342 allow for the transfer cable 320 to transition into or out of a concentric relationship with the cooling line 336. The coolant system 330 further includes an outside loop 344 fluidly connecting the first transfer box 340 to the second transfer box 342. Moreover, a heat exchanger 346 is positioned in thermal communication with the outside loop for removing heat from the coolant 338 flowing therethrough. During operation, coolant 334 may flow substantially continuously from the first transfer box 340, through the cooling line 336 to the second transfer box 342, and from the second transfer box 342 through the outside loop back to the first transfer box 340 (with the heat exchanger 346 operating to remove heat therefrom). Although not depicted, in certain embodiments, a pump or other means may be provided for inducing such flow of coolant 338 through the coolant system 330.

Notably, although the exemplary power bus 306 of FIG. 9 does not include any ICCs, such as ICCs 316, 318, in other embodiments, one or more ICCs may be included.

Figure 11:
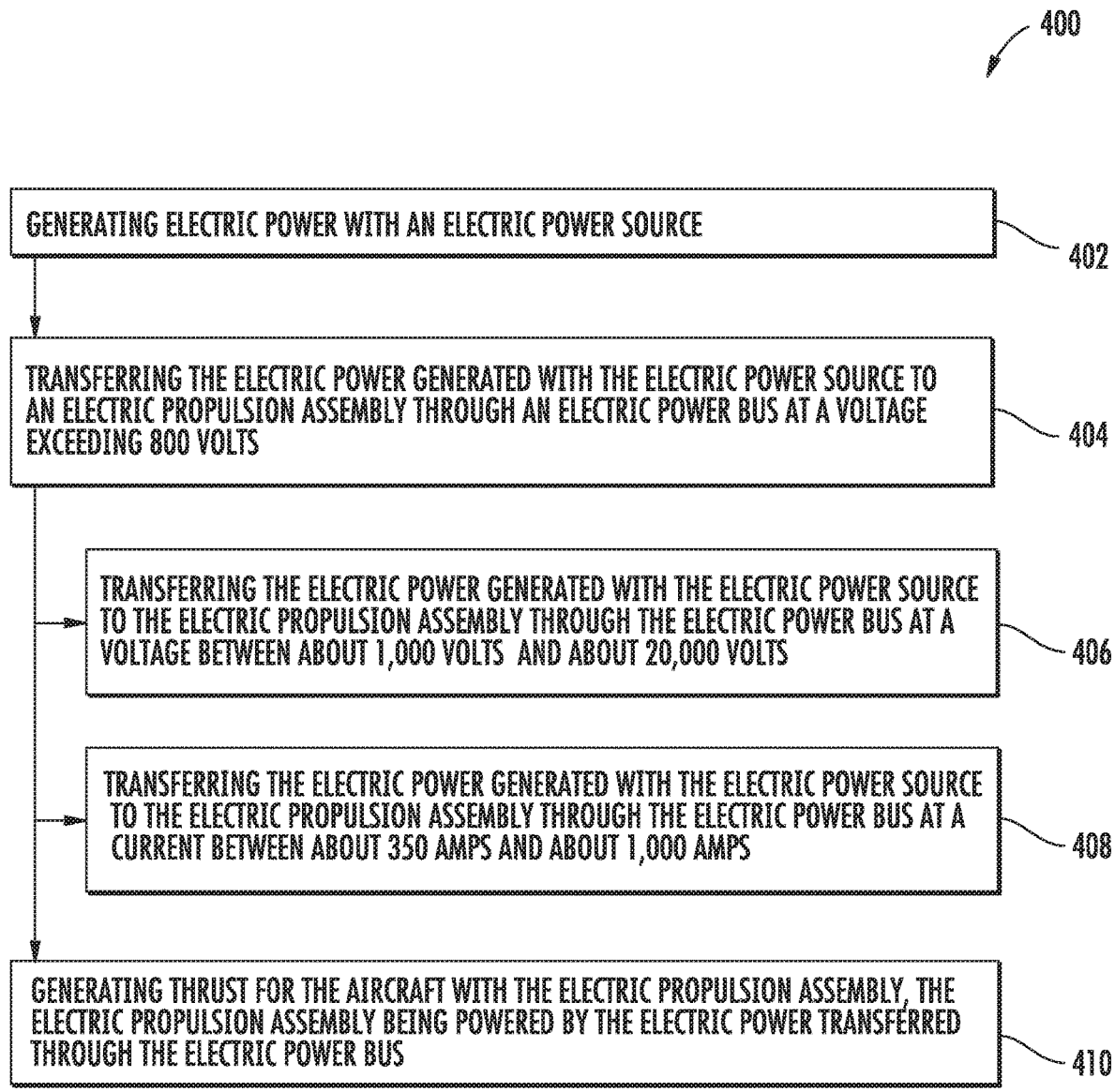
FIG. 11 is a flow chart of a method for operating a propulsion system in accordance with an exemplary aspect of the present disclosure.

Referring now to FIG. 11, a flow diagram is provided of a method 400 for operating a propulsion system for an aircraft in accordance with an exemplary aspect of the present disclosure. In certain exemplary aspects, the exemplary method 400 may be utilized with one or more of the exemplary propulsion systems described above with reference to FIGS. 1 through 10.

As is depicted in FIG. 11, the exemplary method 400 includes at (402) generating electric power with an electric power source. In certain exemplary aspects, generating electric power with the electric power source at (402) may include rotating/driving an electric generator of the electric power source with a combustion engine of the electric power source.

Additionally, the exemplary method 400 includes at (404) transferring the electric power generated with the electric power source to an electric propulsion assembly through an electric power bus at a voltage exceeding 800 volts. More specifically, for the exemplary aspect depicted in FIG. 11, transferring the electric power generated with the electric power source to the electric propulsion assembly through the electric power bus at (404) includes at (406) transferring the electric power generated with the electric power source to the electric propulsion assembly through the electric power bus at a voltage between about 800 volts and about 20,000 volts. Further, still, for the exemplary aspect depicted in FIG. 11, transferring the electric power generated with the electric power source to the electric propulsion assembly through the electric power bus at (404) additionally includes at (408) transferring the electric power generated with the electric power source to the electric propulsion assembly through the electric power bus at an electrical current between about 30 amps and about 1,200 amps.

Moreover, as stated, the exemplary method 400 may be utilized with one or more of the exemplary propulsion systems described above. Accordingly, although not depicted, in certain exemplary aspects, transferring the electric power generated with the electric power source to the electric propulsion assembly through the electric power bus at (404) may additionally include transferring the electric power generated with the electric power source to the electric propulsion assembly through a high voltage cable, the high voltage cable potentially including a conductor, a conductor screen enclosing the conductor, an insulation layer enclosing the conductor screen, an insulator screen enclosing the conductor, and a metallic shield enclosing the insulator screen. Additionally, or alternatively, in other exemplary aspects, transferring the electric power generated with the electric power source to the electric propulsion assembly through the electric power bus at (404) may include transferring the electric power generated with the electric power source to the electric propulsion assembly through a high voltage cable extending coaxially with a cooling line of a coolant system.

Referring still to the exemplary aspect depicted in FIG. 11, the exemplary method 400 further includes at (410) generating thrust for the aircraft with the electric propulsion assembly, the electric propulsion assembly being powered by the electric power transferred through the electric power bus. For example, in certain exemplary aspects, generating thrust for the aircraft at (410) may include rotating the propulsor of the electric propulsion assembly with an electric motor of the electric propulsion assembly, with the electric motor receiving electrical power from the electric power bus.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft comprising:
   an electric power source;
   an electric propulsion assembly comprising an electric motor and a propulsor, the propulsor powered by the electric motor;
   an electric power bus electrically connecting the electric power source to the electric propulsion assembly, the power bus including a cable comprising a conductor and a conductor screen enclosing the conductor, wherein the conductor screen has a volume resistivity between about 1 ohm-meter and 1,000,000 ohm-meters; and
   an inverter converter controller positioned along the electric power bus and electrically connected to the electric power source at a location downstream of the electric power source and upstream of the electric propulsion assembly, the inverter converter controller configured to convert the electric power from the electric power source to a voltage between 800 and 20,000 volts.

2. The propulsion system of claim 1, wherein the electric power bus is configured to transfer the electric power to the electric propulsion assembly at the voltage between 800 and 20,000 volts.

3. The propulsion system of claim 1, wherein the inverter converter controller is configured to increase a voltage of the electric power received from the electric power source.

4. The propulsion system of claim 1, wherein the inverter converter controller is configured to decrease the voltage of the electric power received from the electric power source.

5. The propulsion system of claim 2, wherein the inverter controller is configured to transfer the electric power to the electric propulsion assembly to operate the electric propulsion assembly at a voltage between 800 and 20,000 volts.

6. The propulsion system of claim 1, wherein the electric power bus is configured to transfer the electric power to the electric propulsion assembly to operate the electric propulsion assembly at an electrical current between about 30 amps and about 1,200 amps.

7. The propulsion system of claim 1, wherein the electric power source comprises a combustion engine and an electric generator.

8. The propulsion system of claim 7, wherein the combustion engine is at least one of a turboprop engine or a turbofan engine.

9. A propulsion system for an aircraft comprising:
   an electric power source;
   an electric propulsion assembly comprising an electric motor and a propulsor, the propulsor powered by the electric motor;
   an electric power bus electrically connecting the electric power source to the electric propulsion assembly, the electric power bus including a cable comprising: a conductor, a semi-conductive conductor screen, and an outer sheath on an opposing side of the conductor screen from the conductor, wherein the electric power source configured to provide electrical power to the electric power bus; and
   an inverter converter controller positioned along the electric power bus and electrically connected to the electric power source, wherein the inverter converter controller is configured to alter a voltage of the electric power received from the electric power source by at least 100% prior to powering the electric motor.

10. The propulsion system of claim 9, wherein the inverter converter controller increases the voltage to a voltage between 800 and 20,000 volts.

11. The propulsion system of claim 9, wherein the inverter converter controller is configured to increase the voltage of the electric power received from the electric power source by up to 1,000%.

12. The propulsion system of claim 9, wherein the electric power bus includes a cable, the cable further comprising:
   an insulation layer enclosing the conductor screen; and
   a semi-conductive insulator screen enclosing the insulation layer.

13. The propulsion system of claim 9, wherein the electric propulsion assembly further comprises a plurality of electric motors and a plurality of propulsors, each propulsor powered by a respective one of the electric motors.

14. The propulsion system of claim 9, wherein the electric power bus further comprises a coolant system having a cooling line, wherein at least a portion of a voltage cable extends coaxially with the cooling line.

15. A method for operating a propulsion system for an aircraft comprising:
generating electric power with an electric power source;
transferring the electric power through an inverter converter that increases the voltage from the electric power source to an output voltage between 800 and 20,000 volts;
transferring the electric power generated with the electric power source to an electric propulsion assembly through an electric power bus, the power bus including a cable, wherein the cable includes a conductor, a conductor screen enclosing the conductor, an insulation layer enclosing the conductor screen, an insulator screen enclosing the conductor, and a metallic shield enclosing the insulator screen; and
generating thrust for the aircraft with the electric propulsion assembly, the electric propulsion assembly being powered by the electric power transferred through the electric power bus.

16. The method of claim 15, wherein transferring the electric power generated with the electric power source to the electric propulsion assembly through the electric power bus comprises transferring the electric power through an inverter converter controller positioned along the electric power bus at a location downstream of the electric power source and upstream of the electric propulsion assembly.

17. The method of claim 16, wherein transferring the electric power through an inverter converter includes converting electrical power from an alternating current electric power configuration to a direct current electric power.

18. The method of claim 16, wherein transferring the electric power through an inverter converter includes decreasing the voltage from the electric power received from the electric power source.

* * * * *